(12) United States Patent
Shioya et al.

(10) Patent No.: US 9,201,293 B2
(45) Date of Patent: Dec. 1, 2015

(54) PROJECTION DISPLAY APPARATUS AND CONTROL METHOD THEREFOR

(75) Inventors: Yukinori Shioya, Tokyo (JP); Hiroki Tanaka, Tokyo (JP); Kenji Kanzaka, Tokyo (JP); Michio Kobayashi, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 339 days.

(21) Appl. No.: 13/813,878

(22) PCT Filed: Aug. 19, 2010

(86) PCT No.: PCT/JP2010/063986
§ 371 (c)(1),
(2), (4) Date: Feb. 1, 2013

(87) PCT Pub. No.: WO2012/023195
PCT Pub. Date: Feb. 23, 2012

(65) Prior Publication Data
US 2013/0128241 A1    May 23, 2013

(51) Int. Cl.
*G03B 21/14*    (2006.01)
*G03B 21/20*    (2006.01)
*H04N 9/31*    (2006.01)

(52) U.S. Cl.
CPC ............ *G03B 21/14* (2013.01); *G03B 21/2053* (2013.01); *H04N 9/3155* (2013.01)

(58) Field of Classification Search
CPC ... H04N 9/3197; H04N 9/3155; H04N 9/312; G03B 21/206; G03B 21/14; G03B 21/2053; G03B 33/06; H05B 41/39; H05B 33/08; H05B 37/00; H05B 41/00; H05B 41/14; H05B 41/36; H05B 41/37; H05B 41/38

USPC ............ 353/85, 121; 348/759; 345/690, 600; 315/169.4, 291, 292, 293, 294, 295, 315/296, 297, 298, 299, 300, 301, 302, 303, 315/304, 305, 306, 307, 308, 309, 310, 311
See application file for complete search history.

(56) References Cited

U.S. PATENT DOCUMENTS

| | | | |
|---|---|---|---|
| 2005/0057726 A1* | 3/2005 | Uehara ........................... | 353/30 |
| 2006/0285085 A1* | 12/2006 | Hirota et al. .................... | 353/85 |
| 2008/0218702 A1* | 9/2008 | Koyama et al. ................. | 353/85 |

(Continued)

FOREIGN PATENT DOCUMENTS

| | | |
|---|---|---|
| JP | 2006-071682 A | 3/2006 |
| JP | 2006-133405 A | 5/2006 |

(Continued)

OTHER PUBLICATIONS

International Search Report in PCT/JP2010/063986 dated Sep. 14, 2010(English Translation Thereof).

*Primary Examiner* — Christina Riddle
*Assistant Examiner* — Christopher Lamb
(74) *Attorney, Agent, or Firm* — McGinn IP Law Group PLLC

(57) ABSTRACT

A projection display apparatus includes: a display element that displays an image; a lamp that illuminates the display element to cause the display element to emit an image light; a variable light intensity element that allows the light emitted from the lamp to pass therethrough, the intensity of light passing through the variable light intensity element being variable; and a light intensity controller that determines whether the display element is at an image mute state in which a full-black image is displayed, or at a normal lighting state other than the image mute state, and when the display element is at the image mute state, reduces the amount of power supplied to the lamp to a level that is lower than that of the normal lighting state to decrease the intensity of light emitted from the lamp, and also decreases the intensity of light that passes through the variable light intensity element.

10 Claims, 3 Drawing Sheets

(56) References Cited

U.S. PATENT DOCUMENTS

2009/0091272 A1     4/2009   Yamada et al.
2009/0109350 A1*    4/2009   Koyama ........................ 348/759
2009/0135208 A1*    5/2009   Miura ........................... 345/690
2009/0244496 A1*   10/2009   Sugino et al. ................... 353/85
2010/0002200 A1*    1/2010   Pekarski ........................ 353/85
2010/0022000 A1     1/2010   Pekarski

FOREIGN PATENT DOCUMENTS

| JP | 2006133405 A | * | 5/2006 |
| JP | 2008-527405 A |  | 7/2008 |
| JP | 2009-093862 A |  | 4/2009 |

\* cited by examiner

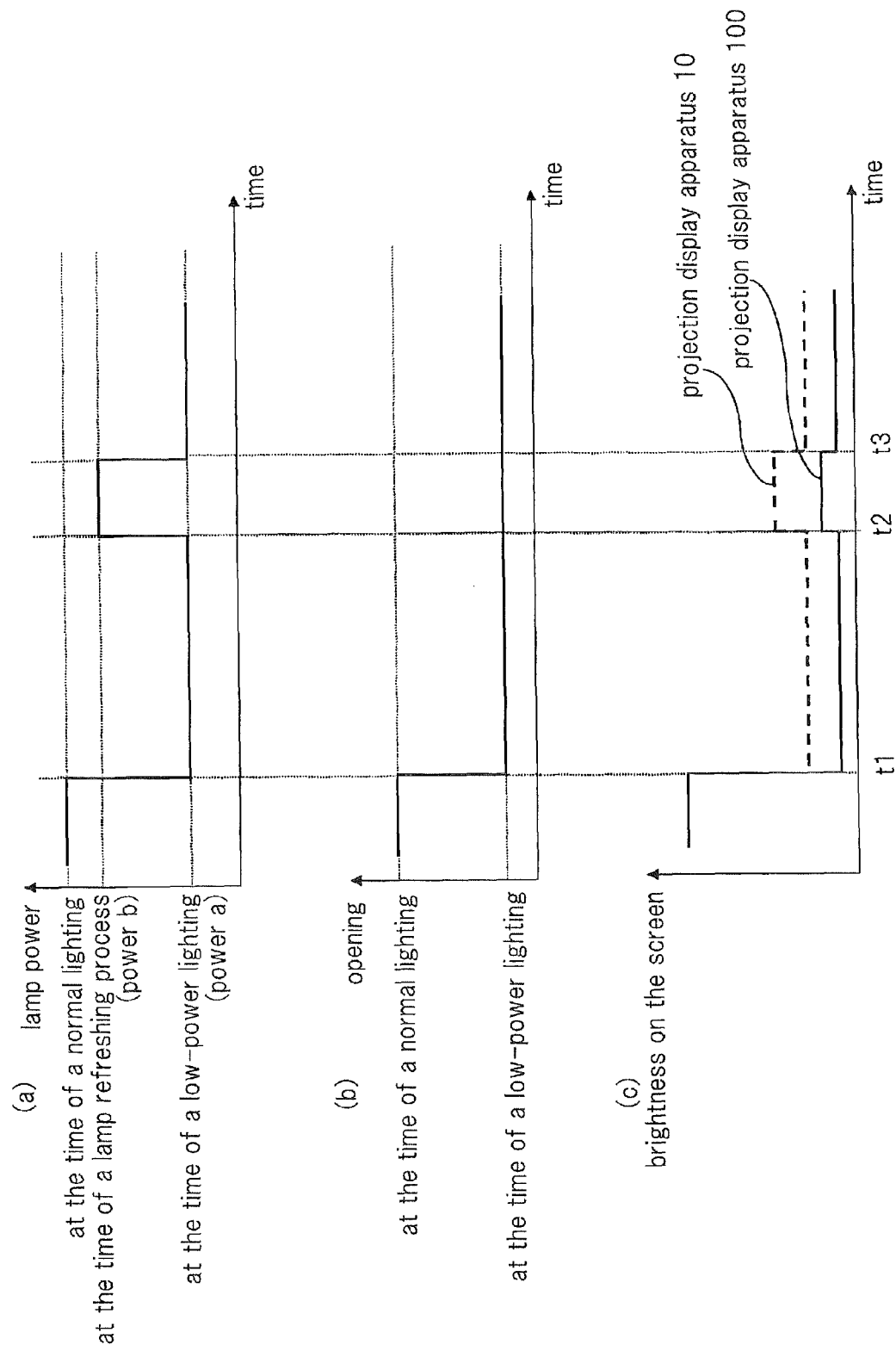

PROJECTION DISPLAY APPARATUS AND CONTROL METHOD THEREFOR

TECHNICAL FIELD

The present invention relates to a projection display apparatus and control method therefor.

BACKGROUND ART

When a projection display apparatus is projecting an image light onto a screen, the projection may be temporarily interrupted according to operation which is entered by a user. A projection display apparatus has been discussed in which the amount of lamp power that is supplied to a lamp is reduced in order to conserve electrical power during periods when the projection is interrupted. The configuration of such a projection display apparatus is illustrated in FIG. 1.

The projection display apparatus illustrated in FIG. 1 comprises power source 11, ballast 12, lamp 13, image signal controller 14, display element 15, and light intensity controller 16. In FIG. 1, an outline arrow indicates a light flux.

Ballast 12 adjusts the lamp power that is supplied from power source 11 to lamp 13 in accordance with a control signal received from light intensity controller 16. Lamp 13 is lighted by a lamp power supplied from power source 11 via ballast, and illuminates display element 15.

Image signal controller 14 receives an image signal from the outside and provides the image signal to display element 15. Display element 15 displays an image indicated by the image signal received from image signal controller 14. Display element 15 may be, for example, a liquid crystal element that is sandwiched by deflection plates in the form of crossed Nichol prism.

By being illuminated by the light emitted from lamp 13, an image light emitted from display element 15 is projected onto screen 20.

Light intensity controller 16 receives an interrupt operation to interrupt projection which is entered by the user. When the interrupt operation is entered, light intensity controller 16 instructs image signal controller 14 to cause display element 15 to display a full-black image. By performing a control to display a full-black image on display element 15, light emitted from lamp 13 is unable to reach screen 20, thus interrupting the projection. In the following, a state in which projection is interrupted is called "an image mute state", and a state other than the image mute state is called "a normal lighting state".

When the interrupt operation is entered, light intensity controller 16 also provides a control signal to ballast 12 such that lamp power that is lower than lamp power at the normal lighting state is supplied to lamp 12.

Projection display apparatus 10 described above achieves power saving because during the interruption of projection, low-power lighting is performed in which lamp 13 is lighted up with lamp power whose level is lower than the level during a normal lighting state.

Typically, a lamp of a projection display apparatus is a discharge lamp. Accordingly, lighting a lamp at a lamp power that is lower than a predetermined power (rated power) causes unstable light emission and damages the electrode and luminous tube of the lamp.

Thus, Patent Document 1 (JP2009-093862A) discloses a technique in which, if the lamp power is lower than the rated power for a certain period of time or longer, then a lamp refreshing process is carried out to temporarily increase the lamp power at the appropriate time interval. According to this technique, even if lighting a lamp at a lamp power that is lower than the rated power damages the electrode and the luminous tube of the lamp, the lamp refreshing process can return the states of the electrode and the luminous tube to normal states.

PRIOR ART DOCUMENT

Patent Document

Patent Document 1 JP2009-093862A SUMMARY OF INVENTION

Problems to Be Solved By the Invention

However, the above-described projection display apparatus is problematic in that only by displaying a full-black image onto display element 15, it is impossible to completely interrupt light emitted from lamp 13, and a certain light intensity reaches screen 20, thus causing image light that is difficult to see, be projected.

Furthermore, in the case of applying the technique disclosed in Patent Document 1 to projection display apparatus 10, the lamp refreshing process causes the lamp power to vary at a timing that is not intended by the user. Variation in lamp power, in turn, varies the luminance of lamp 13. This variation causes a problem of variation in brightness of the image light.

It is an object of the present invention to provide a projection display apparatus and a control method therefor that can solve the problem described above.

Means to Solve the Problems

To achieve the above-described object, a projection display apparatus according to the present invention that projects an image light based on an image, comprises:

a display element that displays said image;

a lamp that illuminates the display element to cause the display element to emit the image light;

a variable light intensity element that allows the light emitted from the lamp to pass therethrough, the intensity of light passing through the variable light intensity element being variable; and a light intensity controller that determines whether the display element is at an image mute state in which a full-black image is displayed, or at a normal lighting state other than the image mute state, and when the display element is at the image mute state, reduces the amount of power supplied to the lamp to a level that is lower than that of the normal lighting state to decrease the intensity of light emitted from the lamp, and also decreases the intensity of light that passes through the variable light intensity element To achieve the above-described object, a control method in a projection display apparatus according to the present invention comprises: a display element that displays an image; a lamp that illuminates the display element to cause the display element to emit an image light; a variable light intensity element that allows the light emitted from the lamp to pass therethrough, the intensity of light passing through the variable light intensity element being variable, wherein a light intensity controller determines whether the display element is at an image mute state in which a full-black image is displayed, or at a normal lighting state other than the image mute state, and when the display element is at the image mute state, reduces the amount of power supplied to the lamp to a level that is lower than that of the normal lighting state to decrease the intensity of light emitted from the lamp, and also decreases the intensity of light that passes through the variable light intensity element.

Effects of the Invention

According to the present invention, when a projection display apparatus detects that the display element is at the image mute state, the projection display apparatus reduces the amount of power supplied to the lamp to a level that is lower than that of the normal lighting state to decrease the intensity of light emitted from the lamp, and also decreases the intensity of light that passes through the variable light intensity element. This makes it possible to prevent variation in brightness of image light on the screen due to variation in lamp power.

BRIEF DESCRIPTION OF THE DRAWINGS

FIG. 3 is a view explaining the operation of the projection display apparatus shown in FIG. 2.

DESCRIPTION OF EMBODIMENTS

Exemplary embodiments of the present invention will be described below with reference to the drawings.

Figure 1:
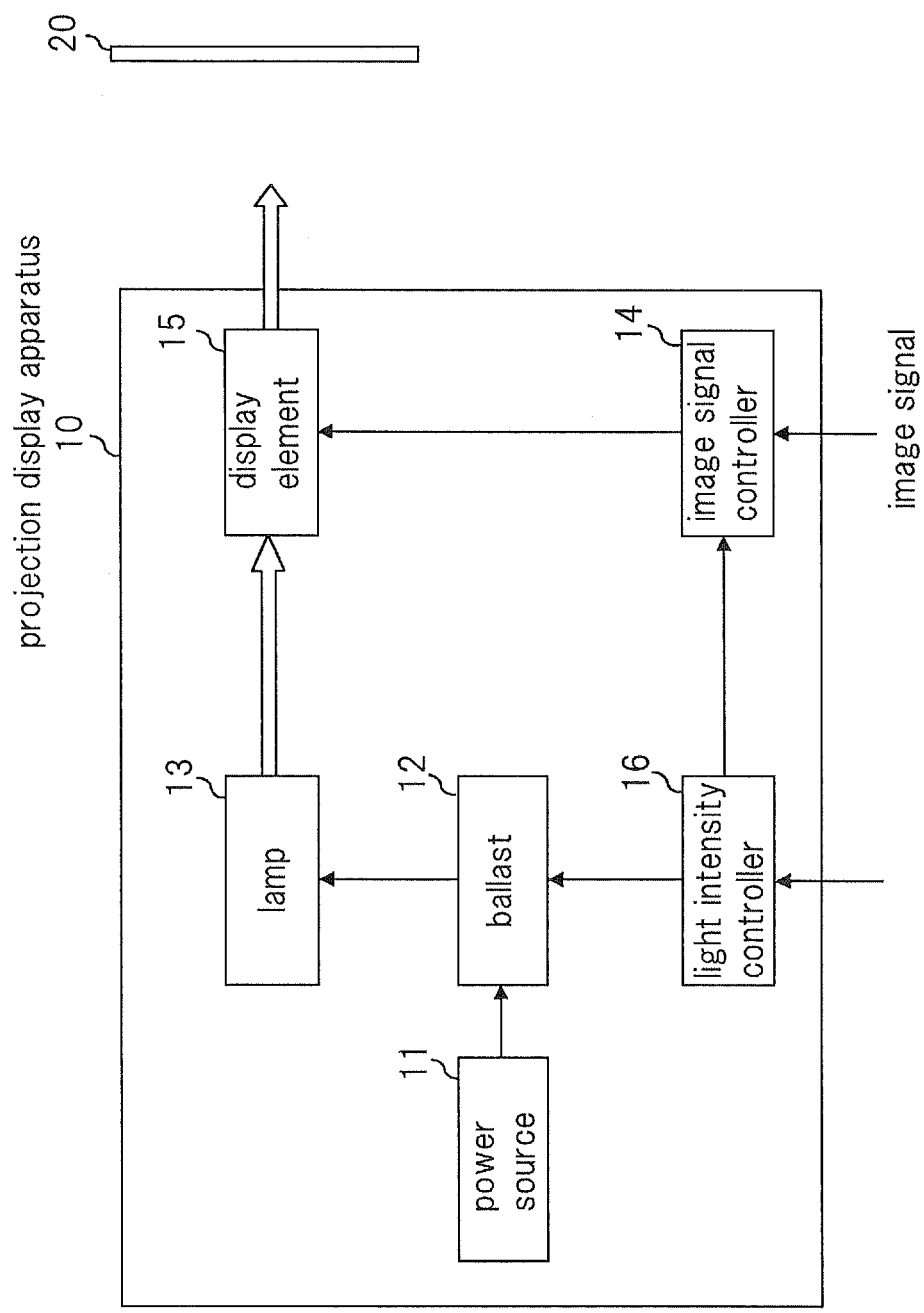
FIG. 1 is a view showing the configuration of a related projection display apparatus.
Figure 2:
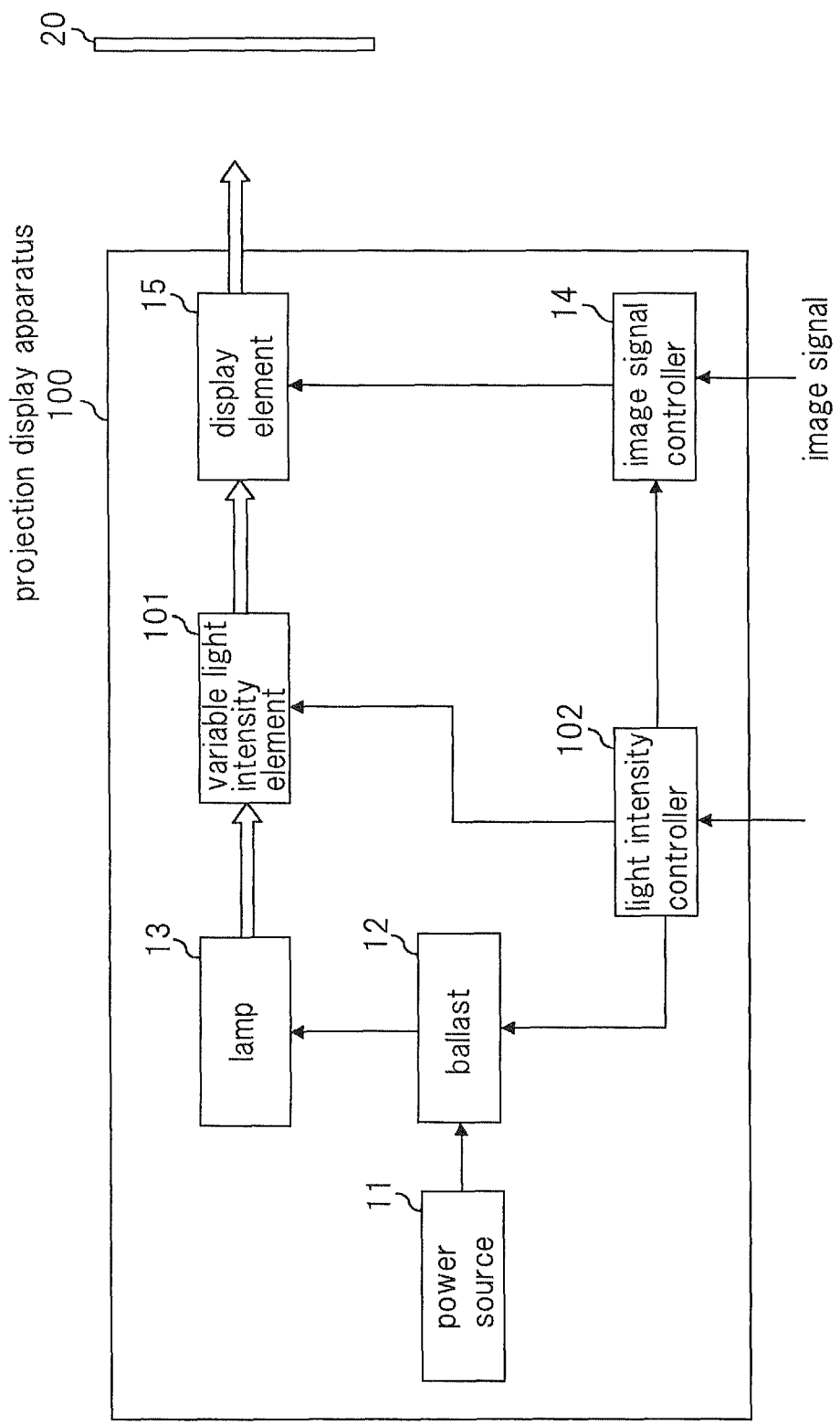
FIG. 2 is a block diagram showing the configuration of a projection display apparatus according to an exemplary embodiment of the present invention.

FIG. 2 is a block diagram showing the configuration of projection display apparatus 100 according to an exemplary embodiment of the present invention. Note that the same components as those in FIG. 2 as those in FIG. 1 are denoted by the same reference numerals and that a description thereof will be omitted. In FIG. 2, an outline arrow indicates a light flux.

Projection display apparatus 100 shown in FIG. 2 comprises power source 11, ballast 12, lamp 13, image signal controller 14, display element 15, variable light intensity element 101 and light intensity controller 102.

Variable light intensity element 101 is an element which is provided between lamp 13 and display element 15, and which allows the light emitted from lamp 13 to pass therethrough, the intensity of light passing through the variable light intensity element being variable. In the following explanation, an aperture will be used as an example of variable light intensity element 101. Variable light intensity element 101 adjusts the opening of the aperture in accordance with a control signal output from light intensity controller 102.

Light intensity controller 102 is adapted to receive an interrupt operation which is entered by the user. When the interrupt operation is entered, light intensity controller 102 instructs image signal controller 14 to cause display element 15 to display a full-black image. Light intensity controller 102 also receives a resume operation which is entered after the entry of the interrupt operation, to resume projection. When the resume operation is entered, light intensity controller 102 instructs image signal controller 14 to cause display element 15 to display an image indicated by the image signal.

During the period from the entry of the interrupt operation to the entry of the resume operation, light intensity controller 102 detects that display element 15 is in the image mute state, and provides a control signal to ballast 12 to decrease the lamp power supplied from power source 11 to lamp 13 from the power at the normal lighting state.

When display element 15 enters the image mute state, light intensity controller 102 provides a control signal to variable light intensity element 101 to change the opening of the aperture which is variable light intensity element 101.

Next, an operation of projection display apparatus 100 will be described with reference to FIG. 3.

FIG. 3(a) is a timing chart of the lamp power, FIG. 3(b) is a timing chart of the opening of the aperture which is variable light intensity element 101, and FIG. 3(c) is a timing chart of the brightness on the screen when projection is interrupted during the implementation of projection by projection display apparatus 10 shown in FIG. 1 and by projection display apparatus 100 according to the present exemplary embodiment. In FIG. 3(c), a solid line, and a dotted line show the brightness on the screen when the projection is interrupted during the implementation of projection by projection display apparatus 10 and projection display apparatus 100, respectively.

When the projection is started, light intensity controller 102 receives an interrupt operation which is entered by the user.

When the interrupt operation is entered at time t1, light intensity controller 102 instructs image signal controller 14 to cause display element 15 to display a full-black image. When display element 15 transitions to the image mute state in which the full-black image is displayed, the brightness on the screen decreases as shown in FIG. 3(c).

When display element 15 enters the image mute state at time t1, light intensity controller 102 provides a control signal to ballast 12 to cause a smaller amount of power to be supplied to lamp 13 that the amount of power that is supplied at the normal lighting state. As shown in FIG. 3(a), in response to the control signal received from light intensity controller 102, ballast 12 adjusts the lamp power supplied from power source 11 to lamp 13 such that the amount of power that is supplied to lamp 13 is smaller than the amount of power that is supplied at the normal lighting state. As a result, lamp 13 is lighted by using the low power of lamp power a, which decreases the intensity of the light emitted from lamp 13.

Here, lamp power a is set at a power which is equal to or less than 30% of lamp power at the normal lighting state, for example. If lamp 13 is turned off when projection is interrupted, it takes much time for lamp 13 to be lighted again when it returns to the normal lighting state, etc. However, if lamp 13 is not turned of and is lighted by using low power, then the amount of time that is needed for brightness to be restored to lamp 13, when it returns to the normal lighting state, is shortened. In the following, it is assumed that lamp power a is lower than the rated power of lamp 13.

When display element 15 enters the image mute state at time t1, light intensity controller 102 provides a control signal to variable light intensity element 101 to make the opening of the aperture smaller than that at the normal lighting state. As shown in FIG. 3(b), in response to the control signal received from light intensity controller 102, variable light intensity element 101 makes the opening of the aperture smaller than that at the normal lighting state. As a result, the intensity of the light emitted from lamp 13 that passes through the aperture is decreased.

Next, light intensity controller 102 measures the elapsed time after the start of low power lighting.

As described earlier, if lamp 13 is lighted by using an amount of power that is smaller than the rated power, then the emission of light becomes unstable, causing damages to the electrodes and luminous tubes.

Hence, in order to restore the electrodes and luminous tubes of lamp 13 to the normal state when a predetermined time has elapsed since the low power lighting started, light intensity controller 102 performs a lamp refreshing process to temporarily increase the lamp power at a suitable time interval.

In the following, assume that as the lamp refreshing process is executed, light intensity controller 102 performs an operation to provide a control signal to ballast 12 such that when the low power lighting is continued for 30 minutes, lamp power b, which is 70% of the lamp power at the normal lighting state, is supplied to lamp 13 for 10 minutes, and then original lamp power a is supplied to lamp 13.

As shown in FIG. 3(a), in response to the control signal received from light intensity controller 102, ballast 12 makes an adjustment such that lamp power b is supplied to lamp 13 between time t2 that is 30 minutes after t1, and time t3 that is 10 minutes after t2, and lamp power a is supplied to lamp 13 after time t3. Please note that the opening of the aperture remains small even during the execution of the lamp refreshing process.

As describe above, projection display apparatus 10 suffers from two problems as described below.

The first problem is that only causing display element to display a full-black image results in the projection of image light onto screen 20 that is difficult to see.

The second problem is that the lamp refreshing process may cause the lamp power to increase at timings that are not intended by the user, thus changing the brightness on screen 20.

In contrast, according to projection display apparatus 100 of the present exemplary embodiment, the intensity of the light emitted from lamp 13 that passes through variable light intensity element 101 is decreased, thereby ensuring that light emitted from lamp 13 is interrupted.

Accordingly, as shown FIG. 3(c), at the low-power lighting after time t1, projection display apparatus 100 can cause the brightness on screen 20 to be lower than the brightness that is projected onto screen 20 by projection display apparatus 10, and furthermore can prevent the variation of the brightness on screen 20 during a time period between t2 and t3 of which the lamp refreshing process is performed.

The present exemplary embodiment illustrates, as an example, that lamp 13, variable light intensity element 101, and display element 15 are arranged along the light path in this order, but the arrangement of these elements is not limited thereto. For example, lamp 13, display element 15, and variable light intensity element 101 may be arranged along the light path in this order.

The present exemplary embodiment illustrates, as an example, that as variable light intensity element 101, an aperture is used, but variable light intensity element 101 is not limited thereto. For example, a permeable liquid crystal element may be used as variable light intensity element 101. Alternatively, a shutter may be used to completely shut off light.

When an aperture is used as variable light intensity element 101, the diameter of the beam of light emitted from the lamp may undergo a change. However, use of crystal liquid element can inhibit a change in the diameter of the beam of light.

Now consider a case in which the intensity of the light from the lamp is constant. When a liquid crystal element is used as variable light intensity element 101, even if a control to make constant the intensity of the light that passes through the liquid crystal element is performed, the intensity may be changed. However, this will not occur when an aperture is used, and light emitted from lamp 13 is reliably interrupted.

The present exemplary embodiment illustrates, as an example, that when an interrupt operation is entered, light intensity controller 102 performs a control to decrease the lamp power at the same timing as a timing at which a full-black image is displayed onto display element 15. However, the timing at which the lamp power is decreased, is not limited thereto, and may differ from a timing at which the full-black image is displayed onto display element 15. Alternatively, for example, light intensity controller 102 may determine whether or not an image signal has been entered, and when it is determined that the image signal has not been entered, may automatically decrease the lamp power, Furthermore, the present exemplary embodiment illustrates, as an example, that when an interrupt operation is entered, the intensity of light that passes through variable light intensity element 101 is decreased at the same timing as the timing at which the lamp power is decreased. However, the timing at which the intensity of light that passes through variable light intensity element 101, is decreased, is not limited thereto. In order to prevent the change of the brightness on screen 20, the intensity of light that passes through variable light intensity element 101 may be decreased at an arbitrary timing prior to the lamp refreshing process.

The invention of this application has thus been described with reference to exemplary embodiments. However, the present invention is not limited to the exemplary embodiments. Various modifications that those skilled in the art can understand may be made in configurations or details of the invention of this application within the scope of the invention of this application.

The invention claimed is:

1. A projection display apparatus projecting an image light based on an image, comprising:
    a display element that displays said image;
    a lamp that illuminates said display element to cause said display element to emit said image light;
    a variable light intensity element that allows the light emitted from said lamp to pass therethrough, the intensity of light passing through the variable light intensity element being variable; and
    a light intensity controller that determines whether said display element is at an image mute state in which a full-black image is display, or at a normal lighting state other than said image mute state, and when said display element is at said image mute state, reduces the amount of power supplied to said lamp, and also decreases the intensity of light that passes through said variable light intensity element,
    wherein when said light intensity controller detects that said lamp power is smaller than a predetermined value for a certain period of time or longer under said image mute state, said light intensity controller increases the lamp power to said predetermined value, and after elapse of a predetermined period of time, reinstates the lamp power to a value which was prior to the time when the lamp power was increased to said predetermined value, and
    wherein a value of said lamp power at a time when said display element is at said image mute state, is lower than a rated power of said lamp.

2. The projection display apparatus according to claim 1, wherein said variable light intensity element comprises an aperture.

3. The projection display apparatus according to claim 2, when the display element enters the image mute state, the light intensity controller provides a control signal to the variable light intensity element to make an opening of the aperture smaller than that at the normal lighting state.

4. The projection display apparatus according to claim 1, wherein said variable light intensity element comprises a liquid crystal element.

5. The projection display apparatus according to claim 1, wherein when an image signal is not entered, said light intensity controller puts said display element into said image mute state.

6. The projection display apparatus according to claim 1, wherein the predetermined value is a percentage of the normal lighting state of the lamp.

7. A control method of a projection display apparatus including a display element that displays an image, a lamp that illuminates said display element to cause said display element to emit an image light, a variable light intensity element that allows the light emitted from said lamp to pass therethrough, the intensity of light passing through said variable light intensity element being variable, wherein a light intensity controller determines whether said display element is at an image mute state in which a full-black image is displayed, or at a normal lighting state other than said image mute state, and when said display element is at said image mute state, reduces the amount of power supplied to said lamp, and also decreases the intensity of light that passes through said variable light intensity element, wherein when said light intensity controller detects that said lamp power is lower than a predetermined value for a certain period of time or longer under said image mute state, said light intensity controller increases the lamp power to said predetermined value, and after elapse of a predetermined period of time, reinstates the lamp power to a value which was prior to the time when the lamp power was increased to said predetermined value, and wherein a value of said lamp power at a time when said display element is at said image mute state, is lower than a rated power of said lamp.

8. The control method of a projection display apparatus according to claim 7, wherein when an image signal is not entered, said light intensity controller puts said display element into said image mute state.

9. The control method of a projection display apparatus according to claim 7, wherein the predetermined value is a percentage of the normal lighting state of the lamp.

10. The control method of a projection display apparatus according to claim 7, further comprising making an opening of an aperture of the variable light intensity element smaller than that at the normal lighting state when the display element enters the image mute state.

* * * * *